United States Patent [19]

Adamson

[11] Patent Number: 4,965,572

[45] Date of Patent: Oct. 23, 1990

[54] METHOD FOR PRODUCING A WARNING OF THE EXISTENCE OF LOW-LEVEL WIND SHEAR AND AIRCRAFTBORNE SYSTEM FOR PERFORMING SAME

[75] Inventor: Hugh P. Adamson, Boulder, Colo.

[73] Assignee: Turbulence Prediction Systems, Boulder, Colo.

[21] Appl. No.: 204,865

[22] Filed: Jun. 10, 1988

[51] Int. Cl.$^5$ .............................................. G08B 21/00
[52] U.S. Cl. ................................... 340/968; 73/178 T; 340/963; 364/434
[58] Field of Search ...................... 340/963, 968, 949; 364/557, 558, 434; 73/178 T, 178 R; 244/191; 374/102, 107, 112; 342/26, 52, 53

[56] References Cited

U.S. PATENT DOCUMENTS

| | | | |
|---|---|---|---|
| 3,427,581 | 2/1969 | Hartman | 340/968 |
| 3,935,460 | 1/1976 | Flint | 374/112 |
| 3,938,386 | 2/1976 | Comfort et al. | 374/107 |
| 4,043,194 | 8/1977 | Tanner | 73/178 T |
| 4,079,905 | 3/1978 | Greene | 340/968 |
| 4,189,777 | 2/1980 | Kuntman | 340/968 |
| 4,250,746 | 2/1981 | Vassie et al. | 73/178 T |
| 4,282,527 | 8/1981 | Winderman et al. | 342/53 |
| 4,319,219 | 3/1982 | Rein-Weston | 73/178 T |
| 4,342,912 | 8/1982 | Adamson | 364/558 |
| 4,346,595 | 8/1982 | Gary | 342/26 |
| 4,589,070 | 5/1986 | Kyrazis | 340/968 |

*Primary Examiner*—Joseph A. Orsino
*Assistant Examiner*—Brent A. Swarthout
*Attorney, Agent, or Firm*—Sixbey, Friedman, Leedom & Ferguson

[57] ABSTRACT

A method for producing a warning of the existence of low-level wind shear and an aircraftborne system for performing the method utilizes measured values of airspeed and temperature, to determine a temperature based hazard factor relating to the existence of a wind shear threat to the aircraft and to issue a warning whenever the hazard factor exceeds a predetermined threshold level based upon the performance characteristics of the aircraft. Temperatures may be sensed locally, such as by a resistive temperature sensor or, remotely, such as by an infrared temperature detector. Furthermore, in accordance with preferred embodiments, an inertial reactive wind shear detector is utilized as an integrated safety measure. Moreover, the threshold level may be varied depending on such factors as aircraft altitude.

50 Claims, 5 Drawing Sheets

METHOD FOR PRODUCING A WARNING OF THE EXISTENCE OF LOW-LEVEL WIND SHEAR AND AIRCRAFTBORNE SYSTEM FOR PERFORMING SAME

FIELD OF THE INVENTION

The present invention relates to methods and apparatus for detecting low level wind shear type turbulence, particularly via aircraftborne sensors.

BACKGROUND OF THE INVENTION

Low-level wind shear (LLWS), a phenomenon associated, for example, with weather fronts, thunderstorms, and low-level jets, poses a major safety hazard for commercial and general aviation. In scheduled air carriers, LLWS is responsible for the most fatalities in the vicinity of air terminals, where aircraft are most vulnerable during landing and takeoff. Furthermore, the potential for tragedy increases each year as the density of air traffic increases.

As a basis for enabling determination of the existence of LLWS as a hazard threat to an aircraft, a function known commonly as a "hazard index" has been developed which produces a warning factor F which is expressible as the following function of the horizontal wind acceleration component Wx, the vertical wind velocity component V airspeed As, and gravitational acceleration g:

$$F = Wx/g + V/As. \qquad [1]$$

The maximum permissible value of warning factor F is determined in relation to the particular performance capabilities of an aircraft and this maximum permissible value F can be used as an alert and warning threshold. For example, inertial reactive systems have been developed (such as that manufactured by Safe Flight Instrument Corporation of White Plains, N.Y.) which utilize the inertial components of an aircraft responding to the wind components Wx and V to produce the warning factor F, and to announce when the aircraft has already encountered LLWS. However, while an inertial reactive system using aircraft acceleration to detect LLWS is helpful, its response time is inherently limited, as is its sensitivity, due to the fact that the large mass of the aircraft is, itself, the sensor. Thus, there is a need for an LLWS warning system which is more sensitive than an inertial reactive system and for one which will be able to remotely predict an LLWS encounter rather than merely react to the encountering of LLWS.

However, the remote sensing of wind velocity, for use in application of the above-noted hazard index, does not represent, at present, a suitable technique for aircraftborne applications. That is, in general, long-range measurement of wind velocity requires the use of radar, while short-range measurements require the use of lidar or sodar. However, radar poses the disadvantages that suitable systems are comparatively large and expensive; antenna side lobes limit usefulness close to the ground; and clear-air targets require high transmitter power. Sodar is prone to problems related to the fact that it sometimes only senses wind in special layers and it is sensitive to noise from precipitation, high wind, and vehicles; while lidar poses a possible danger to eyes and its beam is attenuated by clouds and fog. On the other hand, since many airports will never have enough sophisticated equipment to remotely detect areas of LLWS, the need for aircraftborne LLWS detection systems cannot be eliminated by the development of land based ones.

Another approach that has been taken to the problem of detecting LLWS with sufficient warning, instead of utilizing the above-noted hazard index based on wind speed components, utilizes detection of the existence of temperature gradients, as exist in LLWS turbulence, as a hazard indicating factor. For example, in the present applicant's earlier U.S. Pat. No. 4,342,912, an apparatus for detecting air disturbances created by low level wind shear is disclosed that utilizes an infrared scanning radiometer which uses infrared filters having different distance sensitivities and through which infrared radiation is directed to a radiation sensor which develops signals corresponding to air temperatures at a distance from the aircraft. The temperatures are used with an equation to give an advance warning of an air turbulence hazard to the aircraft, such as due to LLWS, when the temperature gradients detected so indicate. For example, a warning may be issued if the temperatures sensed represent a sustained temperature drop for a predetermined time of at least a predetermined rate.

The use of temperature detection as an indicator of LLWS not only presents an advantage in that airborne, remote temperature sensing techniques may be implemented in a practical manner, but also benefits from the fact that a temperature decrease precedes the winds of an LLWS, offering increased response time. Even though such infrared detecting apparatus can effectively measure temperature gradients associated with LLWS, generating an indication of LLWS on the basis of only temperature related values will not provide the degree of sensitivity and reliability (in terms of minimizing both the number of instances of LLWS that are missed and the number of instances where the existence of LLWS is falsely indicated) as would be achievable using the above-noted, established function for determining the hazard factor F of equation [1] above.

Apart from the available devices for detecting LLWS, various empirical and model atmospheric studies have been conducted which yield functional relationships between wind speed and temperature. In accordance with a model developed by NASA, the following relation exists between maximum temperature drop and peak outflow speed, $U_{max}$; where $\Delta T$ is the temperature drop measured between the temperature of an air parcel within a low-level wind shear event and the ambient temperature enveloping the event:

$$U_{max} = 2.5 \, \Delta T \qquad [2]$$

(MKS units)

Additionally, Donald S. Foster, in an article published in the Monthly Weather Review, Volume 86, No. 3. Mar. 1958, entitled "Thunderstorm Gusts Compared with Computed Downdraft Speeds," reported on a study performed for purposes of forecasting maximum wind gusts expected to accompany thunderstorm activity. In this report, a theoretical downdraft speed relationship was proposed with a vertical velocity $W_o$ being approximated by the relationship between (a) the above-mentioned temperature drop $\Delta T$, (b) the distance Z the above-mentioned air parcel drops, this distance being further defined in the Foster article, (c) the ambient temperature $T_m$ and (d) the acceleration of gravity of:

$$W_o = \sqrt{(-g * Z * \Delta T)/T_m} \quad [3]$$

With respect to the results reported by Foster, a correlation was found, of the speed of the computed downdrafts relative to the gust velocity accompanying the thunderstorms measured, that was statistically significant, even though the correlation (0.50) was not very high, i.e., a significant variation between predicated and actual values existed, resulting in an average computed downdraft velocity of 78 knots relative to an average measured gust velocity of only 61 knots.

SUMMARY OF THE INVENTION

In view of the foregoing, it is a primary object of the present invention to provide a method by way of which a warning of the existence of low-level wind shear can be provided which will possess increased sensitivity and response time relative to methods heretofore used as well as apparatus, in the form of an aircraftborne system, for performing such a method.

It is a further object of the present invention that the improved low-level wind shear warning method and system be capable of detecting both remote as well as local LLWS conditions posing a hazard threat to the aircraft, for example, on takeoff, landing glide profile, or other flight path.

Another object of the present invention is to provide an LLWS warning method and system which is able to utilize known sensing and data processing technology with higher effectiveness than heretofore possible.

A still further object of the present invention is to provide an integrated system for the detection of low-level wind shear which can combine a versatile set of predicted and/or reactive components as well as inertial reactive components to ensure that the aircrew is provided a highly reliable, redundant, and relevant warning.

Yet another object of the present invention is to provide a method and system which will not only provide a LLWS warning, but will provide meaningful output in the form of either feedback to the pilot of the need to take corrective action with respect to aircraft parameters, e.g., to increase airspeed or abort takeoff, as required to avoid a potential hazard, or which can implement necessary corrections during engagement of autopilot guidance.

In addition to the foregoing objects, it is an important object of the present invention to provide a method and system which utilize an LLWS hazard index that is a function of parameters that can be effectively measured, both locally and remotely, from aboard an aircraft in a cost-effective manner using existing technology.

These and other objects of the present invention are achieved, in accordance with preferred embodiments of the present invention, as a result of the inventor's adaptation of known relationships between temperature gradients of the air as a forCing factor of wind components to achieve a temperature-derived hazard index, and the use of this hazard index to achieve a warning factor on the basis of the output from onboard temperature detectors. The hazard factor is compared with a previously established threshold value pertaining to the performance of the aircraft involved, and if this threshold is exceeded, a warning is issued upon which corrective action can be based. On the other hand, if the warning threshold is not exceeded, the process of measuring, determining, and comparing is repeated.

Advance warning of LLWS is achievable, in accordance with the invention, via either local reactive or remote, e.g., IR, sensing means. The remote sensing means can be a conventional multispectral spectrometer or a spectroscopic infrared sensing means designed in accordance with an aspect of the present invention. Local reactive sensing means can utilize data from a digital data bus that is conventionally installed on almost all large new commercial airliners and on which many standard air data parameters, such as airspeed, altitude and temperature, are available once each second. Furthermore, while either remote or local sensing means may be utilized, in accordance with another aspect of the present invention, a warning system is provided which enables both modes of sensing to be utilized with a digital data processing means operating to process data received from both in a time-share mode, or from either the remote or local sensing means in a dedicated mode.

In accordance with another aspect of the present invention, the LLWS warning system can provide a cockpit warning display that is comprised of audible as well as visual warnings. Furthermore, the warnings can be terminated in response to appropriate feedback in the form of appropriate corrective action being taken by the pilot, for example, an increase in airspeed sufficient to bring the warning factor F below the threshold value for the aircraft. Additionally, the LLWS warning system can be made to be interactive with the aircraft's autopilot guidance system, so that when the autopilot is engaged, aircraft parameters will be automatically adjusted in a manner acting to adjust aircraft performance in a manner sufficient to avoid the potential LLWS hazard, in addition to advising the pilot of the potential hazard.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
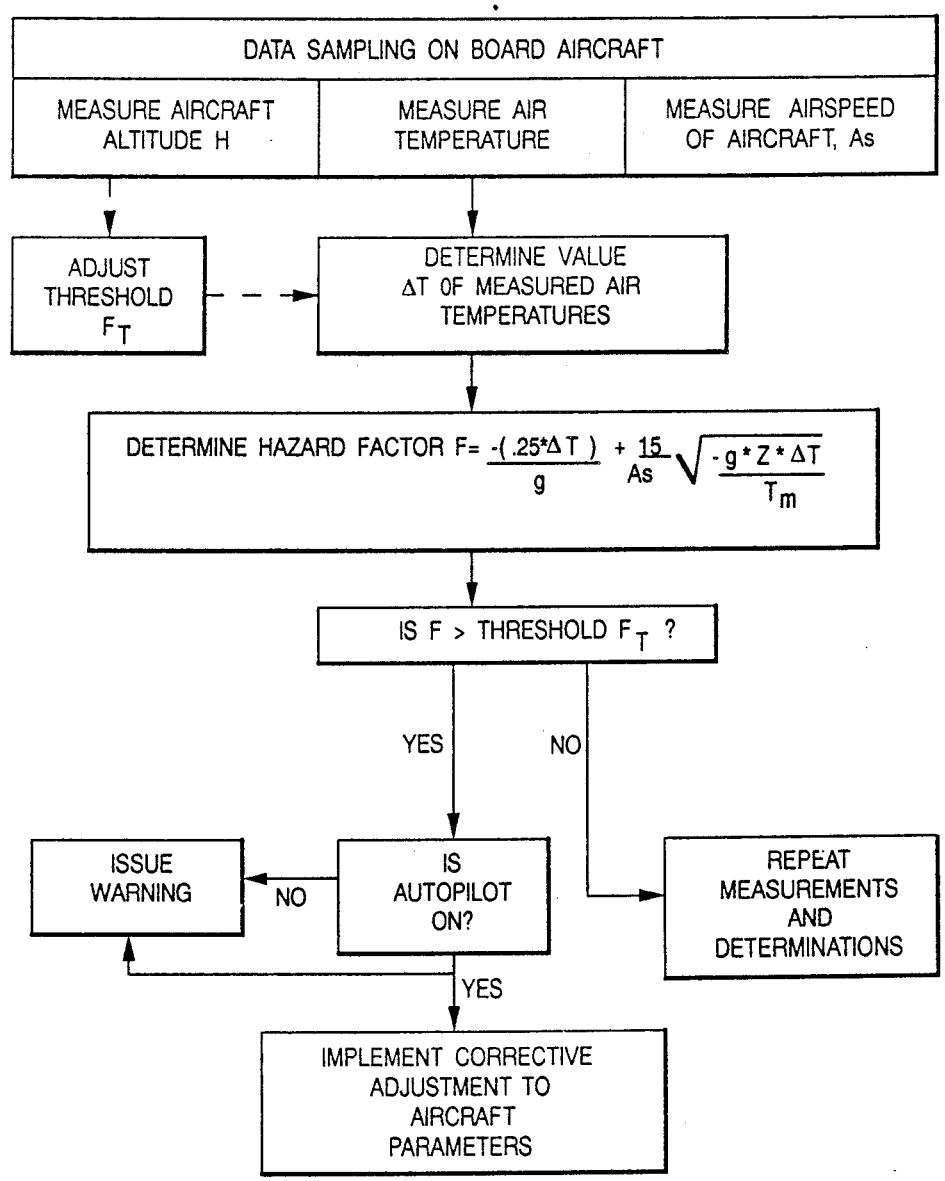
FIG. 1 is a flow chart depicting a method for producing a warning of the existence of LLWS in accordance with a preferred embodiment of the present invention.

FIG. 1 diagrammatically depicts a flow chart for performing a method for producing a warning of the existence of low-level wind shear, the first step of which is the performance of data sampling wherein measurements are obtained onboard of an aircraft which may be in flight, or taxiing for takeoff, for example. This data sampling is carried out on a frequent basis, for example, once per second. In aircraft equipped with a digital data bus, aircraft altitude and airspeed data can be obtained directly from the data bus every second, as can local air temperature data.

Upon obtaining the air temperature values, a value of temperature change $\Delta T$ is determined. In the case where air temperature is measured, both locally and remotely, $\Delta T$ will be determined on the basis of the difference between the remote and local temperatures, or it may, as will always be the case when only local temperature measuring capabilities exist, be determined on the basis of a running average of the rate of change of temperature with respect to time obtained by averaging the temperature values sampled over a given period of time with respect to that period of time.

After determining the value of $\Delta T$, a hazard factor F is determined on the basis of the following relationship:

$$F = -(0.25 * \Delta T)/g + (15/As)\sqrt{-(g * Z * \Delta T)/T_m} \quad [4]$$

where g is gravitational acceleration, As is measured airspeed of the aircraft, Z is the average distance the air parcel drops as discussed in the above Foster article, and $T_m$ is the ambient temperature at the aircraft, this temperature being the same as the local temperature used to define $\Delta T$, as discussed above. Z is a predetermined value which at present has been determined by the inventor to be about 3 kilometers, this determination being an average value based on a large amount of data relating to equation [3] whereby with all of the other parameters, including $W_o$, being known, it is possible to solve for Z. With the analysis of even more data the value of Z may change from 3 kilometers to another value. However, use of the value of 3 kilometers in equation [4] has been particularly successful, as discussed below. The Z value may be stored in a locally available register and accessible to the aircraft sensor data bus, for example. Determination of hazard factor F is in units consistent with the airspeed values available on the aircraft sensor data bus, which is in units of knots, and with the use of a functional constant factor using MKS units and a value in degrees kelvin, with centigrade temperature measurements. Use of a hazard index in this form, instead of expressed in terms of windspeed, as in equation [1], has been arrived at by the present inventor based upon his recognition of the fact that normally a temperature drop associated with an LLWS is detectable before its winds are and that, in addition to the known fact that the horizontal wind component of low-level wind shear is expressible in the manner of equation [2], for purposes of calculating a hazard factor F, the downdraft wind speed predicting equation [3] could be suitably used for the vertical wind component V.

With respect to the latter point concerning use of equation [3] to express the vertical wind component V in equation [1], it is noted that the inventor has established the practicality and reliability of its use in equation [4] by applying the hazard index determination of equation [4] to a normal (i.e., absence of LLWS events) temperature field model of the atmosphere along a hypothetical flight path in order to evaluate the level of nuisance alarms (i.e., false positive warnings), and by applying the hazard index determination along actual flight paths, as reconstructed from data of four revenue service flight recorders, in order to evaluate the certainty and effectiveness of the index in identifying LLWS encounters as well as the predictive time interval. This evaluation showed that the number of events falsely indicated was similar to that for determinations based upon inertially determined hazard factors. Furthermore, in the case of Iberia Flight #933 which encountered an LLWS on Dec. 17, 1973 and impacted at Logan Airport, Boston, Mass., as published Mar. 20, 1974 by the National Transportation Safety Board (NTSB), Washington, D.C., the present invention would have resulted in an LLWS warning having been issued approximately 26 seconds prior to the time of encounter, and approximately 28 seconds prior to the time of impact, while the flight recorder data from Delta Flight #191, which encountered an LLWS and impacted, as reported Oct. 10, 1985 to the NTSB Performance Group by R. E. Bach and R. C. Wingrove in "Estimation of the Winds Along the Flight Path for the L1011 Accident At the Dallas-Fort Worth Airport On Aug. 2, 1985," the present invention, utilizing the hazard index equation [4], would have produced a warning approximately 24 seconds prior to the time of impact. Still further, the flight recorder data of Delta Boeing 767 (Flight #122), which encountered an LLWS on June 11, 1987 during an approach to the Atlanta Airport, but did not result in an accident, indicated that a warning would have been issued at a time as much as 15 seconds prior to the corresponding time of a warning produced by an inertial reactive system. The hazard index as calculated relative to all of the above-noted events were based solely upon locally measured temperatures from the aircraft digital flight data recorders and demonstrates the effectiveness of the invention even when remote temperatures cannot be used.

However, when remote temperatures are available, as reflected by a set of evaluations produced by performing a hazard index analysis of experimental data from an airborne detection test of wind shear events in which remotely sensed infrared radiometer data has been obtained (that of the Denver Joint Airport Weather Studies [JAWS] Project during the summer of 1982 aboard a NASA-Ames Dryden B57B jet aircraft), involving 42 wind shear events reported as being encountered under a wide variety of weather conditions on July 14 and 15, 1982. This analysis resulted in a demonstration that the hazard index determination in accordance with the present invention would have correctly identified all of the 42 events. Moreover, the time in advance of encountering of an LLWS event that a warning level produced by the hazard index based upon IR measured temperature measurements, obtained via a spectrometer at a distance of 3.6 km (a standard observation distance), would enable a warning to be generated at 50 or more seconds in advance of the time to the LLWS event.

After determining the value of hazard factor F in accordance with equation [4], this hazard factor F is compared with a threshold value $F_T$, which is a value that has been predetermined as being the value of warning factor F, above which a hazard to the aircraft exists based upon the aircraft's performance capabilities. For jet aircraft of the type used by scheduled carriers, $F_T$ is in the range of 0.12 to 0.15. Thus, if the comparison of F relative to $F_T$ indicates that the warning factor F is below the threshold $F_T$, no warning is issued, and the data sampling and determining steps are reperformed at, for example, one second intervals, so long as F remains below $F_T$. On the other hand, if this comparison indicates that the threshold $F_T$ has been exceeded, a warning is issued that may be visual and/or audible, and may even provide specific information as to the severity of the impending event. In addition to issuance of a warning, in an aircraft equipped with an autopilot guidance system, the determination of an impending LLWS event can be utilized to implement corrective adjustment to aircraft parameters, such as by increasing the airspeed of the aircraft via increasing engine thrust.

Knowledge of an impending LLWS event is more critical at 500 feet than at 3000 feet, for example. Hence, in accordance with a further aspect of the invention, the threshold $F_T$ may be adjustable, it being lowered as the measured altitude, H, decreases. Moreover, as the distance to an LLWS event decreases, the threshold may be decreased or other appropriate action may be taken to provide, for example, an "advisory" alarm when the distance to the event is large and an "executive" alarm when the event is much closer.

Figure 2:
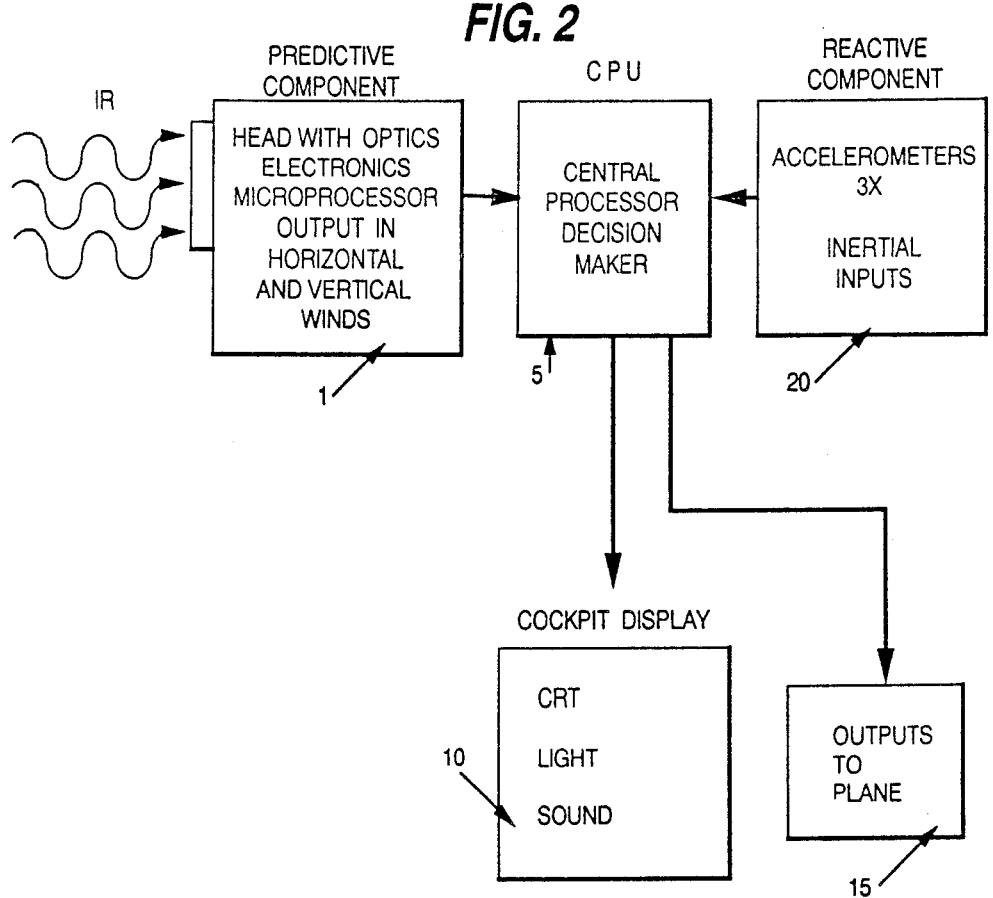
FIG. 2 is a diagrammatic illustration of a system for implementing the method in accordance with FIG. 1.

With reference to FIG. 2, a system for performing the above-described LLWS detecting method is shown that is designed to be installed within an aircraft for airborne use. This system is comprised of a predictive component 1 that is used to determine the value of $\Delta T$ and may be an infrared radiometry type apparatus of the type shown in the present inventor's U.S. Pat. No. 4,342,912 (which is hereby incorporated by reference to the extent that it is necessary to complete an understanding of the present invention), or other commercially available devices, such as the Barnes Model PRT-5 precision radiation thermometer.

The temperature factors determined by the predictive component 1 are output to a central processor decision maker, formed of a CPU, whiCh determines the hazard factor F in accordance with the hazard index of equation [4], as well as compares the resultant factor F with the appropriate threshold $F_T$ to determine whether an LLWS event has been encountered and, optionally, the severity of that threat. When the CPU 5 determines that an LLWS event exists, it aCtivates the appropriate cockpit displays 10 which may be in the form of status words, that are visually or audibly emitted, or an immediately recognizable sound. For example, in accordance with recommendations of widely accepted standards and authorities in the aircraft industry, the warning could be the words "wind shear," repeated three times. Additionally simultaneous with the audible warning, a visual warning could be provided in the form of a flashing red light that is located, as recommended by aircraft industry standards, in the central field of view of the pilot and copilot so as to be easily seen. Still further, the CPU may be connected to the autopilot guidance system of the airplane 15 so that the threat determination by the CPU can be also delivered to the guidance system in the form of outputs which will bring about changes in aircraft parameters, such as engine thrust. Thus, the CPU, in effect, upon determination of the existence of a threat, immediately effectuates corrective action.

Also shown in FIG. 2 is a reactive component 20 which may be in the form of a conventional inertial reactive warning device 20 of the type referred to at the beginning of this application as being manufactured by Safe Flight Instrument Corporation. The integration of a reactive component into the warning system of the present invention may be advantageous, not only as a redundant safety check, because, on takeoff roll, such a reactive system can provide a warning to abort takeoff at a point in time before a predictive system could under certain circumstances. For example, until an airspeed over 60 knots is achieved, a takeoff airspeed cannot be usefully computed, and because a tailwind may make getting an airspeed indication over 60 knots take much longer than the time available before it is too late to abort. That is, the normal time to be at 60 knots would be 20 seconds, but if acceleration, relative to the tailwind, is reduced to 0.5 knots/second, then it would take 120 seconds to reach 60 knots, and this would be too late to abort takeoff.

Figure 3:
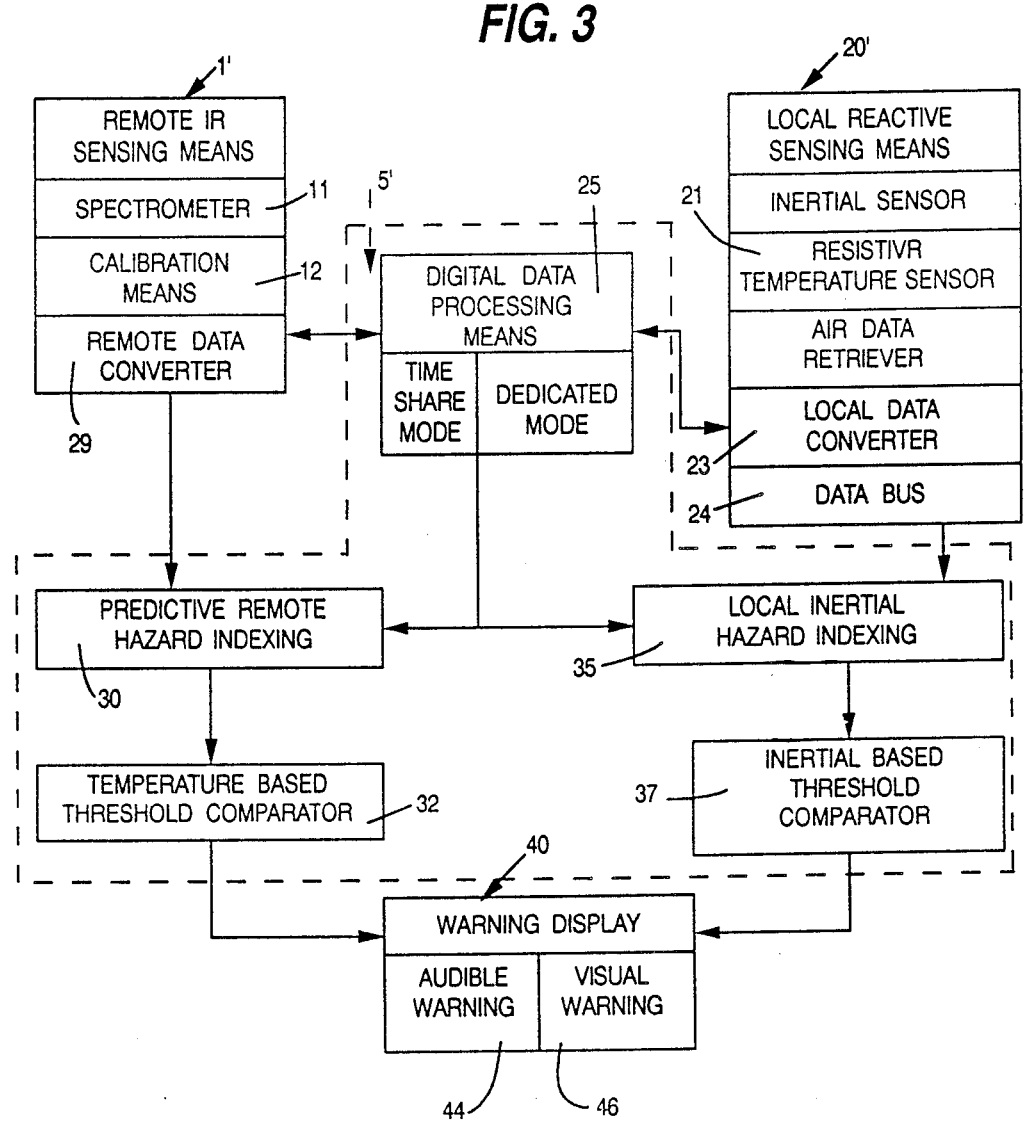
FIG. 3 is a schematic diagram of a second embodiment of a system for performing the method in accordance with the present invention.

FIG. 3 shows another embodiment of an integrated sensing system in accordance with the present invention which, in addition to containing a predictive temperature component and a reactive inertial component, as is the case with the embodiment of FIG. 2, and also contains a reactive temperature system. This reactive temperature system utilizes a local temperature sensing means in the form of a resistive element 21 which changes its impedance with temperature changes, and may be formed of a platinum wire. For example, in a DC-type sensor, a resistance change is converted at a local data converter 23 to a voltage by means of a constant source current, thereby giving a voltage change that is a function of the change in temperature and can be converted to degrees centigrade values in order to be compatible with the system. The data output from the converter 23 are digitized for processing by the digital data processing means 25 of the central processor unit 5'. The temperatures obtained by the reactive temperature system are processed to determine the hazard factor F utilizing the same hazard index, equation [4], from the locally sensed temperatures as are utilized to determine same remotely by the IR sensing means. In this regard, the data bus 24 of the aircraft is utilized as a data acquisition means for obtaining airspeed and altitude data.

The digital data processing means 25, through manual control of mode selection, is able to operate in either a time-share mode or a dedicated mode. In the time-share mode, the digital data processing means switches sequentially between processing the data received from either or both of the temperature sensors (i.e., the remote IR and/or the local resistive temperature sensors) and the local reactive inertial sensing means. However, in the case of failure of either of the remote or local sensing means, through manual control of mode selection, the digital data processing means 25 can be shifted into a dedicated mode wherein data is processed exclusively based upon only one of the types of sensors. In either event, after being processed by the digital data processing means 25, as appropriate, the data processed is utilized to perform either temperature based hazard indexing by the hazard factor determining means 30 or inertial based indexing by the inertial hazard factor determining means 35, and the factor F determined is compared with the appropriate threshold value via the temperature based threshold comparator 32 or the inertial based threshold comparator 37 respectively. Should either of these comparators produce an output indicative of a hazard factor F that is in excess of the maximum permissible hazard factor $F_T$, then the warning display 40 produces an audible warning via the audible warning means 44 and/or a visual warning via the visual warning means 46, comparable to that produced via the cockpit display 10 of the FIG. 2 embodiment.

Furthermore, although not depicted in FIG. 3, for simplicity, the triggering of a warning could be used to trigger automatic intervention and control of the aircraft parameters when autopilot guidance is engaged, as also discussed relative to the FIG. 2 embodiment. For example, the output from the comparators 32, 37 can be provided with a feedback path to the digital data processing means which, via a timer and automatic controls incorporated therein. Can implement the necessary autopilot guidance adjustments to aircraft operating parameters.

Figure 4:
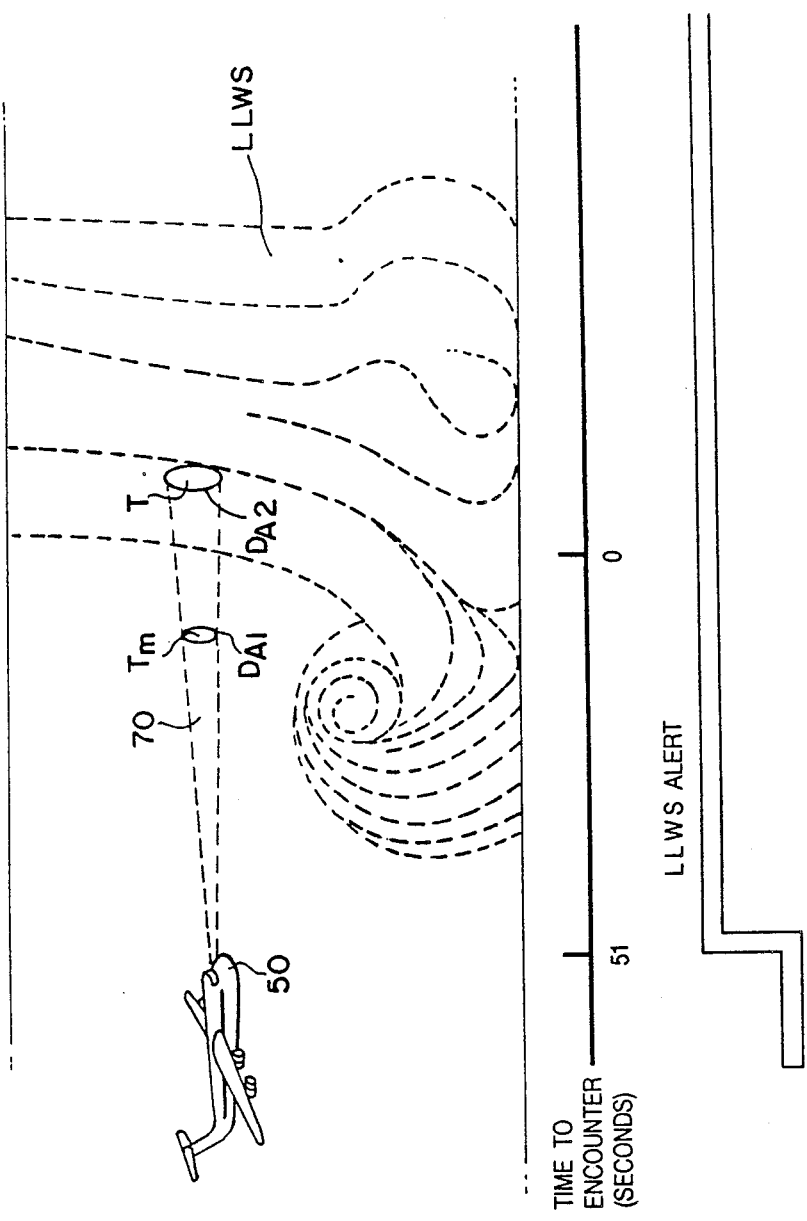
FIG. 4 is a diagrammatic illustration of an aircraft equipped with a system performing the method of the present invention at a point in time when an LLWS alert has been triggered in advance of the LLWS event being encountered.

FIG. 4 illustrates a plane equipped with the system of the present invention during performance of the method via remote infrared temperature sensing. In particular, FIG. 4 shows infrared energy from different detected areas, $D_{A1}$, $D_{A2}$, from spaced remote locations forward of an aircraft in flight 50, being directed to the aircraft 50. From this detected infrared energy, temperatures $T_m$ and T can be sensed and determined, sequentially, in the manner described in the abovenoted U.S. Pat. No. 4,342,912. When, as illustrated, an LLWS is identified as existing in the path of flight, an LLWS alert warning will be triggered, thereby providing sufficient time for corrective action to be taken and an accident avoided.

Figure 5:
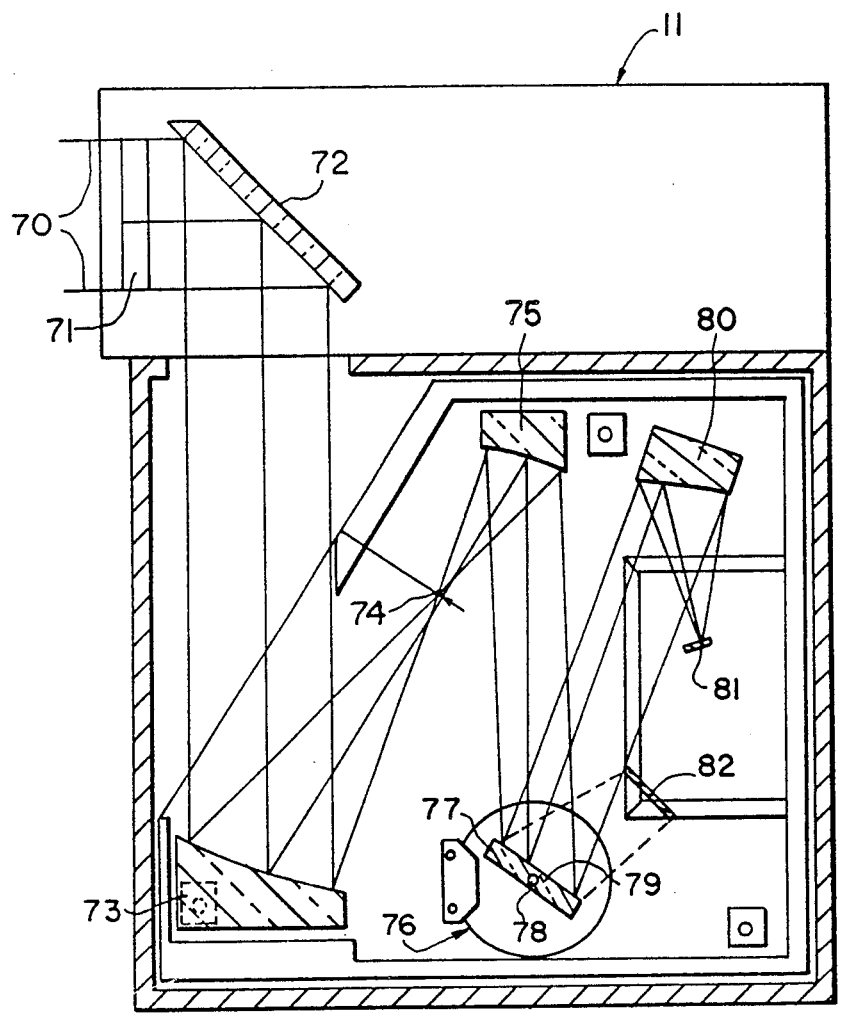
FIG. 5 is a diagrammatic cross-sectional side view of a spectroscopic infrared sensing means for use as an IR sensor of the systems of FIGS. 2 and 3.

However, in accordance with a further aspect of the present invention, instead of utilizing an existing infrared sensing device, the multispectral IR spectrometer 11 of FIG. 5 may advantageously be utilized in the remote IR sensing means 1'. This multispectral IR spectrometer 11 will now be described with reference to FIG. 5 and the processing of a ray trace 70 of FIG. 5, therein.

A ray trace 70 from an IR source, whether remote or local to the system, enters a window 71 of the spectrometer and is reflected at a rotatable planar mirror 72 to a converging primary mirror 73. From primary mirror 73, the ray trace 70 is caused to converge to a harmonic filtered slit 74, after which it is reflected at a diverging secondary mirror 75. As a result, the ray trace 70 is received in a parallel ray configuration at a rotatable planar surface assembly 76. The surface assembly 76 has two receiving surfaces 78, 79, disposed on opposite sides of a rotatable receiving block 77. The first of these surfaces 78 is a planar mirror, and the other surface 79 is a diffraction grating. According to program commands from the data processing means 25, a precisely controlled rotation of the receiving block is carried out. During sensing operation, the ray trace 70 is directed by the diffraction grating 79 to a focusing mirror 80, from which it converges at an IR detector means 81, from which an electrical signal is obtained for processing by the remote data converter 29.

In order to calibrate the spectrometer 11, calibration source 82 provides a reference black body and a known temperature difference, such as 10 degrees centigrade, and the IR emissions radiated from the source 82 are directed to the focusing mirror 80 by the planar mirror 78 which has been rotated into the appropriate position. From focusing mirror 80, the emission from source 82 is reflected to detector 81 and the output delivered to calibration means 12. It should be appreciated that by use of the filter slit 74 to control the infrared frequency bandpasses, the effective sensed distance can be selected, and by comparing the temperature sensed via the ray trace passed on to the sensing means 81 with that calibrated from the source 82, accurate temperature value measurements can be achieved for processing for purposes of determining the hazard factor F from the hazard index of equation [4].

It should be appreciated that, while FIG. 4 shows monitoring of temperature conditions forwardly of the aircraft, provision can be made for monitoring of temperatures in any direction. Rearward monitoring is particularly useful on takeoff or landing to avoid unexpectedly circling into an LLWS event.

Still further, it is pointed out that while the greatest advanced warning comes from the use of remotely sensed temperatures, even those sensed locally will, as indicated above, provide a beneficial result and potentially lifesaving advance warning of an LLWS event to the pilot since the temperature drop associated with an LLWS event will be encountered in advance of its winds, thereby providing a window of opportunity for corrective action even if the warning is provided only as a reaction to the encountering of the temperatures associated with the event. Moreover, such a warning will be received in advance of that which would be provided by any inertial reactive system. On the other hand, in the integrated system of the present invention, by also including an inertial reactive capability, an additional degree of safety is afforded, as mentioned above. Thus, it should be recognized that the present invention provides a method and implementing warning system for low-level wind shear detection that can be aircraftborne and provide increased safety in a simple and economically feasible manner.

While I have shown and described various embodiments in accordance with the present invention, it is understood that the same is not limited thereto, but is susceptible of numerous changes and modification as known to those skilled in the art, and I, therefore, do not wish to be limited to the details such changes and modifications as are encompassed by the scope of the appended claims.

I claim:

1. A method for producing a warning of the possible existence of low-level wind shear comprising the steps of:
    (A) measuring air speed, $A_s$, from on-board an aircraft;
    (B) measuring a first temperature, $T_m$, from on-board the aircraft where said first temperature corresponds to the outside air temperature near the aircraft;
    (C) measuring a second temperature, T, where said second temperature is the temperature of the air a predetermined distance remote from the aircraft;
    (D) determining the difference, $\Delta T$, between the first and second temperatures;
    (E) determining the value of a hazard factor which is a function of at least (a) a first term which is a linear function of at least $\Delta T$ and (b) a second term which is a non-linear function of at least $\Delta T$ and $T_m$ and an inverse function of at least $A_s$;
    (F) comparing the determined hazard factor F with a predetermined threshold value, $F_T$, representing the maximum value of F permissible, based upon the performance capabilities of the aircraft; and
    (G) issuing a warning if the determined value of F exceeds $F_T$ to thus provide a warning to the aircraft of the possible existence of low-level wind shear at said predetermined distance from the aircraft.

2. A method as in claim 1 wherein said hazard factor F is determined as:

$$F = K^* \Delta T + (J/A_s)(\Delta T/T_m)^{\frac{1}{2}}$$

where K and J are constants.

3. A method as in claims 1 or 2 wherein said measurements of $T_m$ and T occur substantially simultaneously.

4. A method as in claim 3 wherein T is measured by infrared remote temperature sensing means.

5. A method as in claim 4 including inertially determining a hazard factor $F_I$ as a function of wind components at the aircraft; determining whether the inertially determined hazard factor $F_I$ exceeds a predetermined maximum permissible value thereof; and issuing said warning if $F_I$ does exceed said maximum permissible value.

6. A method as in claim 4 wherein $T_m$ is measured by local temperature measuring means.

7. A method as in claim 6 including inertially determining a hazard factor $F_I$ as a function of wind components at the aircraft; determining whether the inertially determined hazard factor $F_I$ exceeds a predetermined maximum permissible value thereof; and issuing said warning if $F_I$ does exceed said maximum permissible value.

8. A method as in claim 6 wherein $T_m$ is obtained from a data acquisition bus on board the aircraft.

9. A method as in claim 8 including inertially determining a hazard factor $F_I$ as a function of wind components at the aircraft; determining whether the inertially determined hazard factor $F_I$ exceeds a predetermined maximum permissible value thereof; and issuing said warning if $F_I$ does exceed said maximum permissible value.

10. A method as in claim 6 wherein $T_m$ is measured by a resistive temperature sensor.

11. A method as in claim 10 including inertially determining a hazard factor $F_I$ as a function of wind components at the aircraft; determining whether the inertially determined hazard factor $F_I$ exceeds a predetermined maximum permissible value thereof; and issuing said warning if $F_I$ does exceed said maximum permissible value.

12. A method as in claim 6 wherein $T_m$ is measured by infrared local temperature sensing means.

13. A method as in claim 12 including inertially determining a hazard factor $F_I$ as a function of wind components at the aircraft; determining whether the inertially determined hazard factor $F_I$ exceeds a predetermined maximum permissible value thereof; and issuing said warning if $F_I$ does exceed said maximum permissible value.

14. A method as in claims 1, or 2 where said measurements of $T_m$ and T occur at different times, the measurements of both being made by local temperature measuring means where the time difference between (a) the time at which the temperature $T_m$ is measured and (b) the time at which the temperature T is measured corresponds to the time said aircraft travels through said predetermined distance.

15. A method as in claim 14 where both said measurements are obtained from a data acquisition bus on board the aircraft.

16. A method as in claim 15 including inertially determining a hazard factor $F_I$ as a function of wind components at the aircraft; determining whether the inertially determined hazard factor $F_I$ exceeds a predetermined maximum permissible value thereof; and issuing said warning if $F_I$ does exceed said maximum permissible value.

17. A method as in claim 14 wherein both said measurements are obtained from a resistive temperature sensor.

18. A method as in claim 17 including determining whether an inertially determined hazard factor $F_I$ exceeds a predetermined maximum permissible value thereof and issuing said warning if $F_I$ does exceed said maximum permissible value.

19. A method as in claim 14 wherein both said measurements are obtained from infrared local temperature sensing means.

20. A method as in claim 19 including inertially determining a hazard factor $F_I$ as a function of wind components at the aircraft; determining whether the inertially determined hazard factor $F_I$ exceeds a predetermined maximum permissible value thereof; and issuing said warning if $F_I$ does exceed said maximum permissible value.

21. A method as in claims 1 or 2 including inertially determining a hazard factor $F_I$ as a function of wind components at the aircraft; determining whether the inertially determined hazard factor $F_I$ exceeds a predetermined maximum permissible value thereof and issuing said warning if $F_I$ does exceed said maximum permissible value.

22. A method as in claim 21 including alternately determining F and $F_I$.

23. A method as in claims 1, or 2 including modifying $F_T$ in accordance with the altitude of the aircraft.

24. A method as in claims 1 or 2 including modifying the flight of said aircraft in response to the issuance of the warning signal.

25. A system for producing a warning of the possible existence of low-level wind shear comprising:
  (A) means for measuring air speed, $A_s$, from on-board an aircraft;
  (B) means for measuring a first temperature, $T_m$, from on-board the aircraft wherein said first temperature corresponds to the outside air temperature near the aircraft;
  (C) means for measuring a second temperature, T, where said second temperature is the temperature of the air a predetermined distance remote from the aircraft;
  (D) means for determining the difference, $\Delta T$, between the first and second temperatures;
  (E) means for determining the value of a hazard factor which is a function of at least (a) a first term which is a linear function of at least $\Delta T$ and (b) a second term which is a non-linear function of at least $\Delta T$ and $T_m$ and an inverse function of at least $A_s$;
  (F) means for comparing the determined hazard factor F with a predetermined threshold value, $F_T$, representing the maximum value of F permissible, based upon the performance capabilities of the aircraft; and
  (G) means for issuing a warning if the determined value of F exceeds $F_T$ to thus provide a warning to the aircraft of the possible existence of low-level wind shear at said predetermined distance from the aircraft.

26. A system as in claim 25 where said hazard factor F is determined as:

$$F = K*\Delta T + (J/A_s)(\Delta T/T_m)^{\frac{1}{2}}$$

where K and J are constants.

27. A system as in claims 25 or 54 including means for making said measurements of $T_m$ and T substantially simultaneously.

28. A system as in claim 27 where T is measured by infrared remote temperature sensing means.

29. A system as in claim 28 including means for inertially determining a hazard value $F_I$ as a function of wind components at the aircraft; means for determining whether the inertially determined hazard factor $F_I$ exceeds a predetermined maximum permissible value thereof; and issuing said warning if $F_I$ does exceed said maximum permissible value.

30. A system as in claim 28 where $T_m$ is measured by local temperature measuring means.

31. A system as in claim 30 including means for inertially determining a hazard value $F_I$ as a function of wind components at the aircraft; means for determining whether the inertially determined hazard factor $F_I$ exceeds a predetermined maximum permissible value thereof; and issuing said warning if $F_I$ does exceed said maximum permissible value.

32. A system as in claim 30 where $T_m$ is obtained from a data acquisition bus on board the aircraft.

33. A system as in claim 32 including means for inertially determining a hazard value $F_I$ as a function of wind components at the aircraft; means for determining whether the inertially determined hazard factor $F_I$ exceeds a predetermined maximum permissible value thereof; and issuing said warning if $F_I$ does exceed said maximum permissible value.

34. A system as in claim 30 where $T_m$ is measured by a resistive temperature sensor.

35. A system as in claim 34 including means for inertially determining a hazard value $F_I$ as a function of wind components at the aircraft; means for determining whether the inertially determined hazard factor $F_I$ exceeds a predetermined maximum permissible value thereof; and issuing said warning if $F_I$ does exceed said maximum permissible value.

36. A system as in claim 30 where $T_m$ is measured by infrared local temperature sensing means.

37. A system as in claim 36 including means for inertially determining a hazard value $F_I$ as a function of wind components at the aircraft; means for determining whether the inertially determined hazard factor $F_I$ exceeds a predetermined maximum permissible value thereof; and issuing said warning if $F_I$ does exceed said maximum permissible value.

38. A system as in claims 25 including means for making said measurements of $T_m$ and T at different times, the measurements of both being made by local temperature measuring means where the time difference between (a) the time at which the temperature $T_m$ is measured and (b) the time at which the temperature T is measured corresponds to the time said aircraft travels through said predetermined distance.

39. A system as in claim 38 where both said measurements are obtained from a data acquisition bus on board the aircraft.

40. A system as in claim 39 including means for inertially determining a hazard value $F_I$ as a function of wind components at the aircraft; means for determining whether the inertially determined hazard factor $F_I$ exceeds a predetermined maximum permissible value thereof; and issuing said warning if $F_I$ does exceed said maximum permissible value.

41. A system as in claim 38 where both said measurements are obtained from a resistive temperature sensor.

42. A system as in claim 41 including means for inertially determining a hazard value $F_I$ as a function of wind components at the aircraft; means for determining whether the inertially determined hazard factor $F_I$ exceeds a predetermined maximum permissible value thereof; and issuing said warning if $F_I$ does exceed said maximum permissible value.

43. A system as in claim 38 where both said measurements are obtained from infrared local temperature sensing means.

44. A system as in claim 43 including means for inertially determining a hazard value $F_I$ as a function of wind components at the aircraft; means for determining whether the inertially determined hazard factor $F_I$ exceeds a predetermined maximum permissible value thereof; and issuing said warning if $F_I$ does exceed said maximum permissible value.

45. A system as in claim 25 including means for inertially determining a hazard value $F_I$ as a function of wind components at the inertially determined hazard factor $F_I$ exceeds a predetermined maximum permissible value thereof; and issuing said warning if $F_I$ does exceed said maximum permissible value.

46. A system as in claim 45 including means alternately for determining F and $F_I$.

47. A system as in claim 25 including means for modifying $F_T$ in accordance with the altitude of the aircraft.

48. A system as in claim 25 including means for modifying the flight of said aircraft in response to the issuance of the warning signal.

49. A system as in claim 25 where at least said means for measuring the second temperature is a multispectral spectrometer having an integral calibrating means.

50. A system as in claim 49 where said multispectral spectrometer comprises means for selectively directing energy from (a) an internal calibration black body or (b) an external remote energy source to an infrared energy detector means.

* * * * *